UNITED STATES PATENT OFFICE.

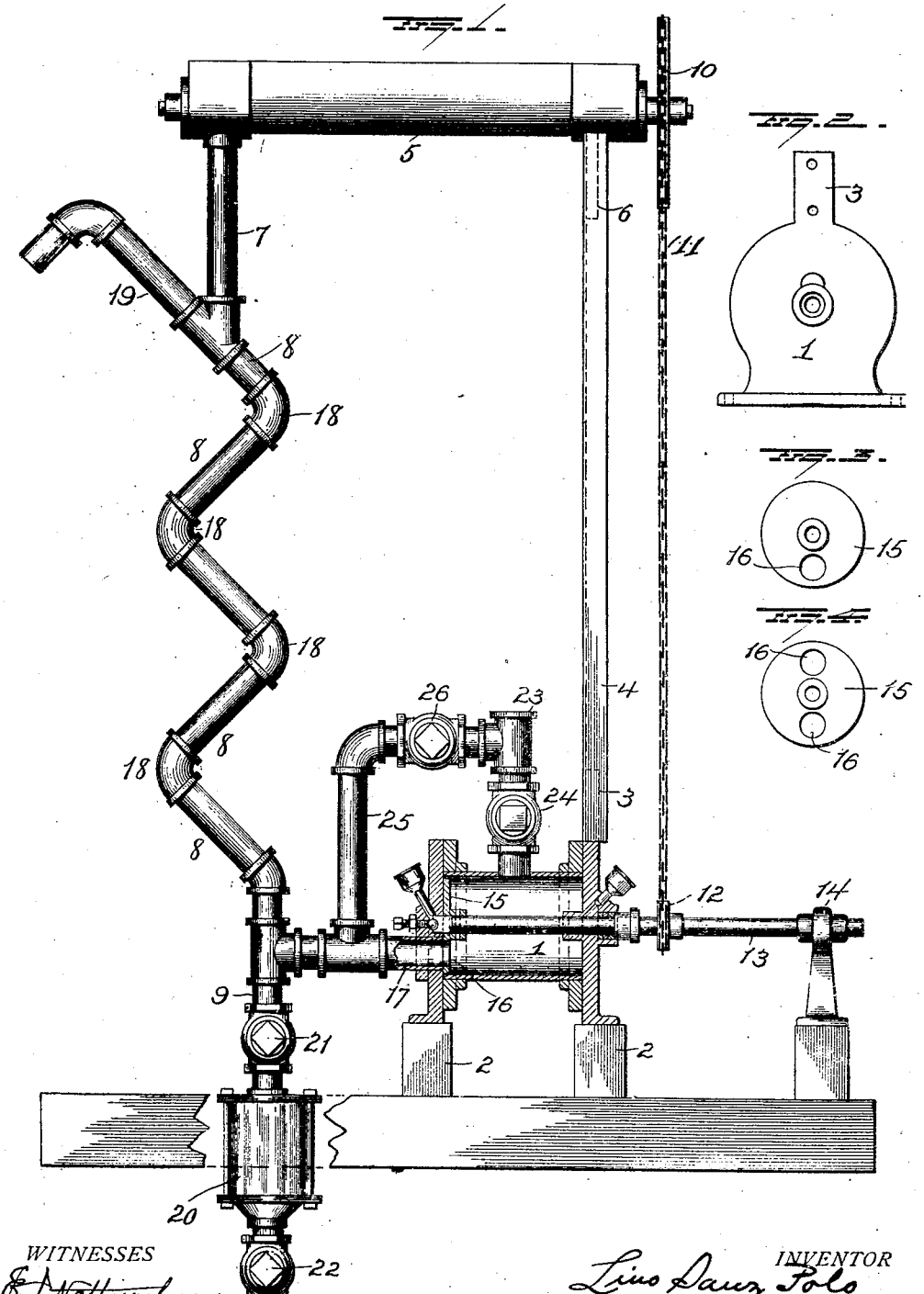

LINO SAUZ POLO, OF TUCSON, ARIZONA.

ORE-CONCENTRATOR.

1,332,751.  Specification of Letters Patent.  Patented Mar. 2, 1920.

Application filed May 5, 1917. Serial No. 166,734.

*To all whom it may concern:*

Be it known that I, LINO SAUZ POLO, subject of the King of Spain, of Tucson, in the county of Pima and State of Arizona, have invented certain new and useful Improvements in Ore-Concentrators; and I do hereby declare the following to be a full, clear, and exact description of the invention, such as will enable others skilled in the art to which it appertains to make and use the same.

This invention relates to improvements in ore concentration,—one object of the invention being to provide simple and efficient means which will operate to facilitate the recovery of a maximum amount of metal, and with the use of which mineral or metal may be recovered from tailings resulting from concentration processes heretofore commonly practised.

With this and other objects in view, the invention consists in certain novel features of construction and combination of features as hereinafter set forth and pointed out in the claim.

In the accompanying drawings; Figure 1 is a view in elevation, partly in section showing an embodiment of my invention, Fig. 2 is an end view of the water supply receptacle, and Figs. 3 and 4 are detail views of disks which may be employed in causing pulsatory flow of water through that portion of the apparatus wherein separation of the valuable constituents of the ore are separated from the gangue.

1 represents a cylinder or water receptacle mounted on suitable base timbers 2—2 and one of its heads may be provided with an upright arm 3 to which the lower end of a standard 4 may be secured. The upper end of the standard 4 supports one end of an elevated feed trough 5, the latter being provided with a depending arm 6 secured to said standard.

The other end of the feed trough 5 may be supported by a connected series of pipe sections 7, 8, 9, hereinafter more specifically described.

A screw conveyer (not shown) may be mounted in the feed trough 5 and its shaft may be provided with a sprocket wheel 10 to which motion is imparted by a drive chain 11, the latter also passing about a sprocket wheel 12 on a shaft 13. Motion is imparted by a drive chain 11, the latter also passing about a sprocket wheel 12 on a shaft 13.

Motion may be imparted in any suitable manner to the shaft 13, or if desired, the mechanism may be driven by power applied to the conveyer shaft. The shaft 13 is mounted in suitable bearings on the heads of the water receptacle 1 and extends from one of said heads approximately to the other, a bearing 14 being provided for the projecting end of the shaft. The inner end of the shaft 13 carries a disk 15 having a hole 16, or if desired, a disk 15 having a plurality of holes 16 as shown in Fig. 4, may be employed. The disk 15 is located in close proximity to the outlet end of the water receptacle so that during its rotation, it will rapidly open and close the end of an outlet pipe 17 which communicates with said water receptacle. The outer end of the pipe 17 communicates with the lower vertical pipe section 9 while the upper vertical pipe section 7 communicates with the feed trough 5. The intermediate pipe sections 8 are arranged in zig-zag formation and connected by suitable couplings 18,—each pipe section being inclined so as to be disposed at between thirty and forty degrees. The upper inclined pipe section is extended upwardly and outwardly beyond the lower end of the upper vertical pipe section 7 and provides a discharge outlet 19 for gangue. The lower pipe section 9 communicates with a receptacle 20 to receive the valuable constituents of the ore being treated,—a valve 21 being provided above said receptacle and an outlet valve 22 being located below the receptacle.

Water may be supplied to the water receptacle from any suitable source under pressure, by way of a pipe 23 provided near said receptacle with a valve 24. A by-pass pipe 25 connects the pipe 23 with the pipe 17, and this by-pass pipe is also provided with a valve 26.

With the construction and arrangement of the apparatus above described, the ore to be concentrated after having been suitably crushed, will be deposited into the trough 5 and the feed screw therein will cause such ore to be discharged into the upper end of the upper vertical pipe section 7 from which it will tend to pass through the zig-zag or inclined pipe sections 8. Within these inclined pipe sections, the ore will be met by an upwardly flowing current of water which, by the operation of the rotating perforated disk 15, will be pulsatory in character. Experience has shown that this pulsatory current of water flowing upwardly through the inclined pipe section while the ore tends to move downwardly through the same, will cause the gangue material to be separate from the valuable constituents and be discharged with the water through the outlet 19, while the valuable constituents, being of greater specific gravity than the gangue, will find their way to the receptacle 20, from which they may be recovered from time to time by manipulating the valves 21 and 22, without stopping the operation of the apparatus.

When the ore being treated is exceedingly heavy a greater volume of water may be necessary and thus may be supplied by opening the valve 26 in the by-pass pipe 25.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is—

In apparatus for concentrating ore, the combination of a connected series of inclined pipe sections having a discharge outlet for gangue at the upper end and a receptacle at the lower end for the reception of valves, a water receptacle and an outlet pipe connecting the latter with the lower portion of said series of pipe sections, a feed device, a pipe connecting one end of the feed device with the upper portion of the series of pipe sections below said discharge outlet and supporting one end of said feed device, a standard between the water receptacle and the other end portion of the feed device for supporting the same, a shaft mounted in the water receptacle, a perforated disk carried by said shaft and disposed to interrupt the flow of water from said receptacle to the lower portion of the connected series of pipe sections, bearing between said shaft and the feed device, a valved water inlet pipe communicating with said receptacle, and a valved by-pass pipe communicating with the water inlet pipe and with the outlet pipe of the water receptacle.

In testimony whereof, I have signed this specification in the presence of two subscribing witnesses.

LINO SAUZ POLO.

Witnesses:
ALEX V. MARTINEZ,
JOHN F. MARTIN.